(12) United States Patent
Yamada (10) Patent No.: US 8,121,764 B2
(45) Date of Patent: Feb. 21, 2012

(54) SHIFT CONTROL DEVICE FOR AUTOMATIC TRANSMISSION AND CONTROL METHOD THEREOF

(75) Inventor: Naohiro Yamada, Atsugi (JP)

(73) Assignee: Jatco Ltd., Fuji-shi (JP)

( * ) Notice: Subject to any disclaimer, the term of this patent is extended or adjusted under 35 U.S.C. 154(b) by 459 days.

(21) Appl. No.: 12/391,545

(22) Filed: Feb. 24, 2009

(65) Prior Publication Data

US 2009/0228180 A1    Sep. 10, 2009

(30) Foreign Application Priority Data

Mar. 7, 2008   (JP) ................................. 2008-058013

(51) Int. Cl.
  *G06F 17/00* (2006.01)
(52) U.S. Cl. ............................................ 701/51; 477/46
(58) Field of Classification Search ............... 701/51, 701/55, 56; 477/3, 2, 46, 43, 48, 45
See application file for complete search history.

(56) References Cited

U.S. PATENT DOCUMENTS

| | | | |
|---|---|---|---|
| 5,035,157 A | 7/1991 | Aoki et al. | |
| 5,044,230 A | 9/1991 | Shinya et al. | |
| 5,393,278 A * | 2/1995 | Kyushima et al. | 477/120 |
| 5,857,937 A | 1/1999 | Ashizawa et al. | |
| 6,694,241 B2 | 2/2004 | Kim | |
| 7,377,877 B2 * | 5/2008 | Ogata | 477/3 |

FOREIGN PATENT DOCUMENTS

| | | |
|---|---|---|
| JP | 03-103661 A | 4/1991 |
| JP | 07-259975 A | 10/1995 |
| JP | 09-126313 A | 5/1997 |
| JP | 09-210159 A | 8/1997 |
| JP | 11-048830 A | 2/1999 |
| JP | 2003-254426 A | 9/2003 |
| JP | 2005-076800 A | 3/2005 |
| JP | 2009-144801 A | 7/2009 |

OTHER PUBLICATIONS

U.S. Appl. No. 12/391,515, filed Feb. 24, 2009, Yamada.
U.S. Appl. No. 12/391,527, filed Feb. 24, 2009, Yamada.
N. Yamada, U.S. PTO Office Action, U.S. Appl. No. 12/391,527, dated Oct. 21, 2011, 10 pages.

* cited by examiner

*Primary Examiner* — Thomas Black
*Assistant Examiner* — Marthe Marc-Coleman
(74) *Attorney, Agent, or Firm* — Foley & Lardner LLP (57) ABSTRACT

In a shift control device for an automatic transmission according to this invention, when the engine load increases such that a kickdown is required, and a gear position calculated in accordance with the shift map from an operating condition defined by a look-ahead vehicle speed at a predetermined future time is lower than a current gear position and the look-ahead vehicle speed is higher than a predetermined vehicle speed, control is performed to shift to a higher gear position than the target gear position.

6 Claims, 8 Drawing Sheets

SHIFT CONTROL DEVICE FOR AUTOMATIC TRANSMISSION AND CONTROL METHOD THEREOF

FIELD OF THE INVENTION

This invention relates to shift control in a stepped automatic transmission, in particular shift control performed during a kickdown.

BACKGROUND OF THE INVENTION

In a stepped automatic transmission, shift control is performed in accordance with a shift map defined by a vehicle speed and a throttle opening. JP2003-254426A discloses determining a look-ahead vehicle speed during deceleration of a vehicle from the deceleration rate of the vehicle, making a shift determination on the basis of the look-ahead vehicle speed, and that as a result, the shift determination can be made earlier. Thus, a situation in which a shift occurs at a delay relative to a schedule determined by a shift line is prevented.

SUMMARY OF THE INVENTION

In the conventional technique described above, the look-ahead vehicle speed is calculated on the basis of a turbine torque, a gear ratio, acceleration, and so on. The values thereof are estimated values estimated from a current traveling condition, and therefore large variation occurs in the look-ahead vehicle speed. As a result, the estimated look-ahead vehicle speed overshoot or undershoot a target look-ahead vehicle speed repeatedly before convergence. The period of a shift is extremely short, and therefore a shift operation ends before this variation in the look-ahead vehicle speed can be converged.

By calculating the look-ahead vehicle speed using actually measured measurement values of the turbine torque and acceleration, the large rate of change in which is the cause of the variation, rather than estimated values, overshooting and undershooting in relation to the target look-ahead vehicle speed of the estimated look-ahead vehicle speed can be prevented, and as a result, the target look-ahead vehicle speed can be converged more quickly.

In so doing, however, the responsiveness of the look-ahead vehicle speed decreases in comparison with a case in which the look-ahead vehicle speed is calculated using estimated values alone. In a traveling condition where an accelerator pedal is pressed hard, the amount of change in the throttle opening and vehicle speed is particularly large, and therefore the look-ahead vehicle speed calculated with a delayed response falls below the target look-ahead vehicle speed. As a result, an operating condition on the shift map, which is determined from the look-ahead vehicle speed and the throttle opening, remains on a low vehicle speed side of an upshift line even though it should cross the upshift line to a high vehicle speed side.

For example, when the current gear position is a second speed and the throttle opening increases due to depression of the accelerator pedal such that the operating condition crosses a 2→1 downshift line on the shift map, and the operating condition based on the look-ahead vehicle speed at this time crosses a 1→2 upshift line to the high vehicle speed side, control is performed to ensure that a 2→1 downshift is not performed. However, due to the response delay, the look-ahead vehicle speed is lower than the target look-ahead vehicle speed, and therefore the operating condition on the shift map remains on the low vehicle speed side of the 1→2 upshift line. As a result, a 2→1 downshift is executed. Moreover, as soon as the downshift is complete, a 1→2 upshift is executed, and therefore the traveling time in the first speed is short. As a result, the driver cannot obtain the intended acceleration, and shift shock occurs twice, i.e. from the second speed to the first speed and from the first speed to the second speed, leading to a shift-busy.

It is an object of this invention to prevent shift-busy and shift shock caused when an upshift is performed immediately after completion of a downshift in a traveling condition where the responsiveness of a look-ahead vehicle speed is low.

In order to achieve the above object, this invention provides a shift control device for an automatic transmission that comprises a shift map defined by an engine load and a vehicle speed and divided into gear position regions by shift lines, a vehicle speed estimating unit that estimates a look-ahead vehicle speed, which is a vehicle speed at a predetermined future time, when the engine load increases such that a shift to a gear position on a low speed side of a current gear position is required, a target gear position setting unit that sets a target gear position according to the region of the shift map in which an operating condition, which is determined by the engine load and the look-ahead vehicle speed, is located, and a shift control unit that performs shift control on the basis of the target gear position, and that the target gear position setting unit sets a gear position on a high speed side of the target gear position as the target gear position when the target gear position is on a low speed side of a current gear position and the look-ahead vehicle speed is higher than a predetermined vehicle speed.

This invention also provides a shift control method for an automatic transmission having a shift map defined by an engine load and a vehicle speed and divided into gear position regions by shift lines that comprises estimating a look-ahead vehicle speed, which is a vehicle speed at a predetermined future time, when the engine load increases such that a shift to a gear position on a low speed side of a current gear position is required, setting a target gear position according to the region of the shift map in which an operating condition, which is determined by the engine load and the look-ahead vehicle speed, is located, and performing shift control on the basis of the target gear position, and that the setting the target gear position sets a gear position on a high speed side of the target gear position as the target gear position when the target gear position is on a low speed side of a current gear position and the look-ahead vehicle speed is higher than a predetermined vehicle speed.

The details as well as other features and advantages of this invention are set forth in the remainder of the specification and are shown in the accompanying drawings.

DESCRIPTION OF THE PREFERRED EMBODIMENTS

Figure 1:
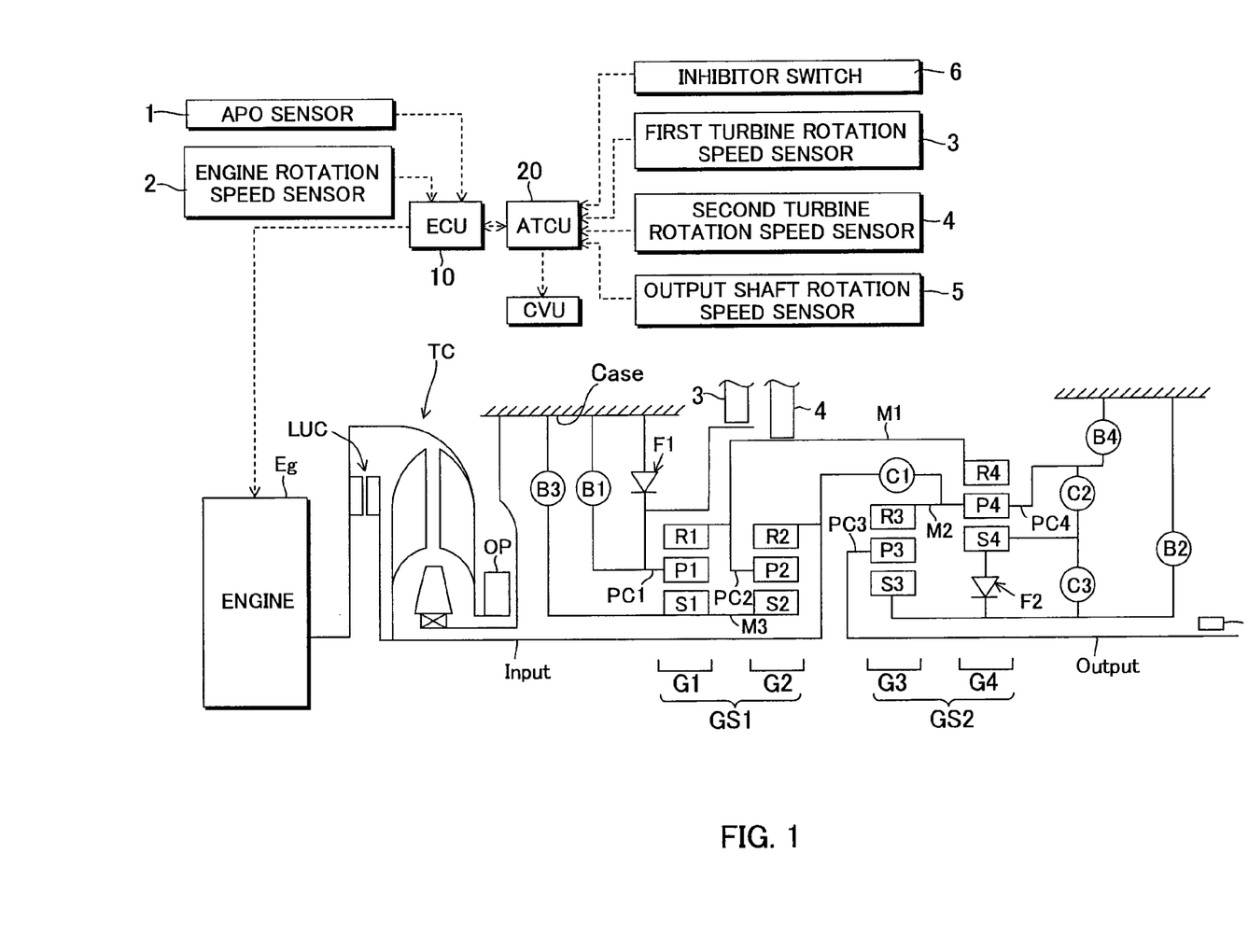
FIG. 1 is a schematic diagram showing the constitution of an automatic transmission according to an embodiment.

An embodiment of this invention will be described in detail below with reference to the figures and so on. FIG. 1 is a schematic diagram showing the constitution of an automatic transmission according to the embodiment. The automatic transmission of this embodiment is a stepped automatic transmission having seven forward speeds and one reverse speed, in which a driving force of an engine Eg is input from an input shaft Input via a torque converter TC, whereupon a rotation speed is shifted by four planetary gears and seven friction engagement elements and output from an output shaft Output. Further, an oil pump OP is provided coaxially with a pump impeller of the torque converter TC and driven to rotate by the driving force of the engine Eg to pressurize oil.

An engine controller (ECU) 10 that controls a driving condition of the engine Eg, an automatic transmission controller (ATCU) 20 that controls a shift condition and so on of the automatic transmission, and a control valve unit CVU that controls an oil pressure of the respective engagement elements on the basis of an output signal from the ATCU 20 are also provided. The ECU 10 and ATCU 20 are connected via a CAN communication line or the like, and communicate with each other to share sensor information and control information.

An APO sensor 1 that detects an accelerator pedal operation amount of a driver and an engine rotation speed sensor 2 that detects an engine rotation speed are connected to the ECU 10. The ECU 10 controls the rotation speed and torque of the engine by controlling a fuel injection amount and a throttle opening on the basis of the engine rotation speed and the accelerator pedal operation amount.

A first turbine rotation speed sensor 3 that detects a rotation speed of a first carrier PC1, a second turbine rotation speed sensor 4 that detects a rotation speed of a first ring gear R1, an output shaft rotation speed sensor 5 that detects a rotation speed of the output shaft Output (a vehicle speed), and an inhibitor switch 6 that detects a shift lever operating condition of the driver are connected to the ATCU 20. The ATCU 20 selects an optimum command gear position based on a vehicle speed Vsp and an accelerator pedal operation amount APO in a D range, and outputs a control command for achieving the command gear position to the control valve unit CVU.

Next, a shift gear mechanism that changes the rotation speed of the input shaft Input and transmits the rotation to the output shaft Output will be described. A first planetary gear set GS1 and a secondary planetary gear set GS2 are arranged in the shift gear mechanism in sequence from the input shaft Input side to the output shaft Output side in an axial direction. Further, a plurality of clutches C1, C2, C3 and brakes B1, B2, B3, B4 are provided as the friction engagement elements, as well as a plurality of one-way clutches F1, F2.

A first planetary gear G1 is a single-pinion type planetary gear having a first sun gear S1, a first ring gear R1, and a first carrier PC1 supporting a first pinion P1 that is meshed to the two gears S1, R1. A second planetary gear G2 is a single-pinion type planetary gear having a second sun gear S2, a second ring gear R2, and a second carrier PC2 supporting a second pinion P2 that is meshed to the two gears S2, R2. A third planetary gear G3 is a single-pinion type planetary gear having a third sun gear S3, a third ring gear R3, and a third carrier PC3 supporting a third pinion P3 that is meshed to the two gears S3, R3. A fourth planetary gear G4 is a single-pinion type planetary gear having a fourth sun gear S4, a fourth ring gear R4, and a fourth carrier PC4 supporting a fourth pinion P4 that is meshed to the two gears S4, R4.

The input shaft Input is connected to the second ring gear R2 and inputs a rotary driving force from the engine Eg via the torque converter TC and so on. The output shaft Output is connected to the third carrier PC3 and transmits an output rotary driving force to a drive wheel via a final gear and so on.

A first connecting member M1 connects the first ring gear R1, the second carrier PC2, and the fourth ring gear R4 integrally. A second connecting member M2 connects the third ring gear R3 and the fourth carrier PC 4 integrally. A third connecting member M3 connects the first sun gear S1 and the second sun gear S2 integrally.

The first planetary gear set GS1 is constituted by four rotary elements obtained by connecting the first planetary gear G1 to the second planetary gear G2 using the first connecting member M1 and the third connecting member M3. The second planetary gear set GS2 is constituted by five rotary elements obtained by connecting the third planetary gear G3 to the fourth planetary gear G4 using the second connecting member M2.

In the first planetary gear set GS1, torque is input into the second ring gear R2 from the input shaft Input, whereupon the input torque is output to the second planetary gear set GS2 via the first connecting member M1. In the second planetary gear set GS2, torque is input directly into the second connecting member M2 from the input shaft Input and into the fourth ring gear R4 via the first connecting member M1, whereupon the input torque is output to the output shaft Output from the third carrier PC3.

An input clutch C1 connects and disconnects the input shaft Input and the second connecting member M2 selectively. A direct clutch C2 connects and disconnects the fourth sun gear S4 and the fourth carrier PC4 selectively.

An H&LR clutch C3 connects and disconnects the third sun gear S3 and the fourth sun gear S4 selectively. Further, a second one-way clutch F2 is disposed between the third sun gear S3 and the fourth sun gear S4. Thus, when the H&LR clutch C3 is disengaged and the rotation speed of the fourth sun gear S4 is higher than that of the third sun gear S3, the third sun gear S3 and fourth sun gear S4 generate independent rotation speeds. As a result, the third planetary gear S3 and the fourth planetary gear G4 are connected via the second connecting member M2, and the respective planetary gears achieve independent gear ratios.

A front brake B1 stops rotation of the first carrier PC1 selectively. Further, the first one-way clutch F1 is disposed parallel with the front brake B1. A low brake B2 stops rotation of the third sun gear S3 selectively. A 2346 brake B3 stops rotation of the third connecting member M3, which connects the first sun gear S1 to the second sun gear S2, selectively. A reverse brake B4 stops rotation of the fourth carrier PC4 selectively.

Figure 2:
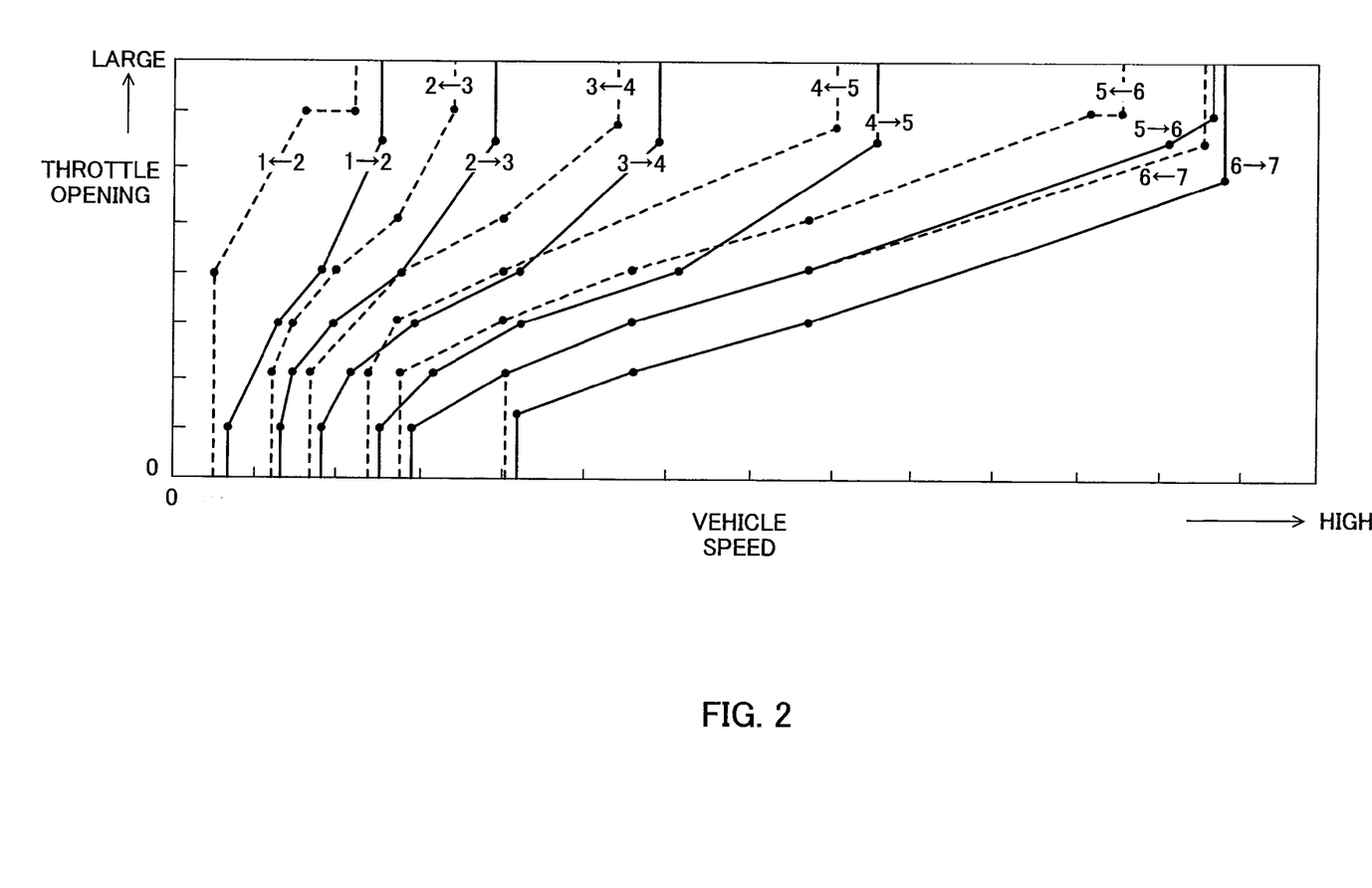
FIG. 2 is a shift line diagram of the automatic transmission.

The automatic transmission constituted as described above switches the gear position between the first through seventh speeds on the basis of the vehicle speed and the throttle opening in accordance with shift lines shown in FIG. 2. In the shift map shown in FIG. 2, a gear position switch is determined when an operating condition determined by the vehicle speed and the throttle opening crosses various upshift lines and various downshift lines. Here, the following problems occur if the responsiveness of the look-ahead vehicle speed, including a measured value, decreases when the driver presses the accelerator pedal hard such that a kickdown is performed to a lower gear position than a current gear position. These problems will be described with reference to FIGS. 3 and 4.

Figure 3:
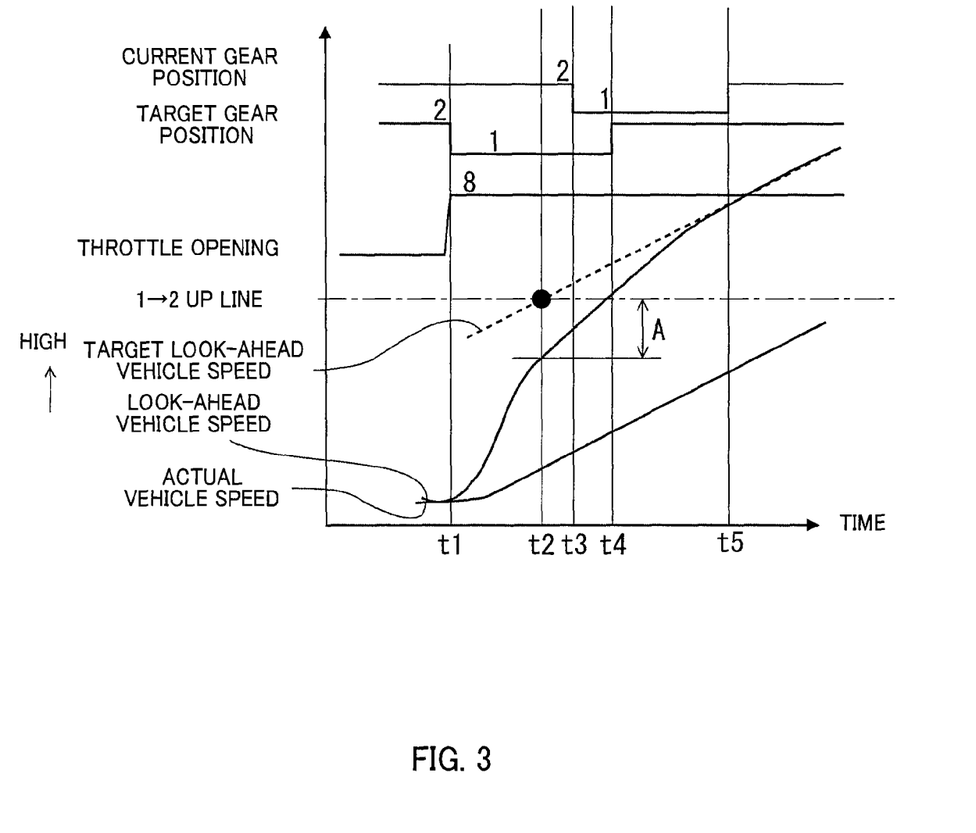
FIG. 3 is a time chart showing problems of a conventional example.
Figure 4:
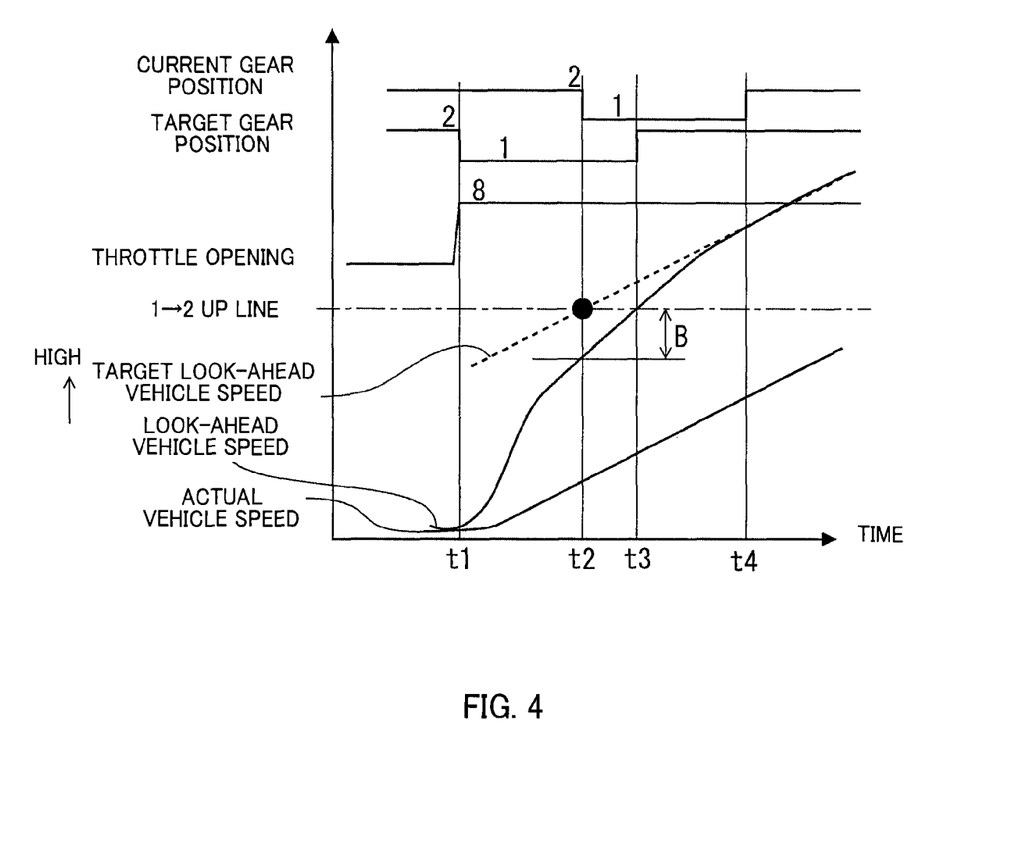
FIG. 4 is a time chart showing problems of the conventional example.

FIGS. 3 and 4 are time charts showing a current gear position, a target gear position, a throttle opening, a target look-ahead vehicle speed, a look-ahead vehicle speed, and an actual vehicle speed. FIG. 3 shows a case in which the target look-ahead vehicle speed crosses a 1→2 up line before a 2→1 downshift is completed, and FIG. 4 shows a case in which the target look-ahead vehicle speed crosses the 1→2 up line immediately after the 2→1 downshift is completed. Here, the target look-ahead vehicle speed is a look-ahead vehicle speed obtained when no response delay exists. Although FIGS. 3 and 4 show cases in which the gear position varies between the second speed and the first speed, this invention is not limited to such cases, and similar problems occur between other gear positions.

In FIG. 3, travel is underway in the second speed gear position, and at a time t1, the driver presses the accelerator pedal hard such that the throttle opening increases and the target gear position shifts to the first speed. At a subsequent time t2, the target look-ahead vehicle speed crosses the 1→2 up line, but due to the response delay, the look-ahead vehicle speed does not cross the 1→2 up line, and therefore the target gear position is held at the first speed.

At a subsequent time t3, a 2→1 downshift is completed, and therefore the actual gear position shifts to the first speed. At a time t4, the look-ahead vehicle speed crosses the 1→2 up line, and therefore the target gear position shifts to the second speed. At a subsequent time t5, a 1→2 upshift is completed, whereby the actual gear position shifts to the second speed.

Hence, under normal circumstances, the target gear position would shift to the second speed at the time t2, i.e. the point at which the target look-ahead vehicle speed crosses the 1→2 up line, whereby a 1→2 upshift following the 2→1 downshift would be determined. However, due to the response delay in the look-ahead vehicle speed, the target gear position does not shift to the second speed until the time t4, and therefore the point at which the gear position returns to the second speed is delayed correspondingly, leading to over-revving.

In FIG. 4, travel is underway in the second speed gear position, and at a time t1, the driver presses the accelerator pedal hard such that the throttle opening increases and the target gear position shifts to the first speed. At a subsequent time t2, a 2→1 downshift is completed such that the actual gear position shifts to the first speed, and the target look-ahead vehicle speed crosses the 1→2 up line. Due to the response delay, however, the look-ahead vehicle speed does not cross the 1→2 up line, and therefore the target gear position is held at the first speed.

At a time t3, the look-ahead vehicle speed crosses the 1→2 up line, and therefore the target gear position shifts to the second speed. At a time t4, a 1→2 upshift is completed, whereby the actual gear position shifts to the second speed.

Hence, under normal circumstances, the target gear position would shift to the second speed at the time t2, i.e. the point at which the target look-ahead vehicle speed crosses the 1→2 up line, whereby a 1→2 upshift would be begun. However, due to the response delay in the look-ahead vehicle speed, the target gear position does not shift to the second speed until the time t3, and therefore the point at which the gear position shifts to the second speed is delayed correspondingly, leading to over-revving.

Figure 5:
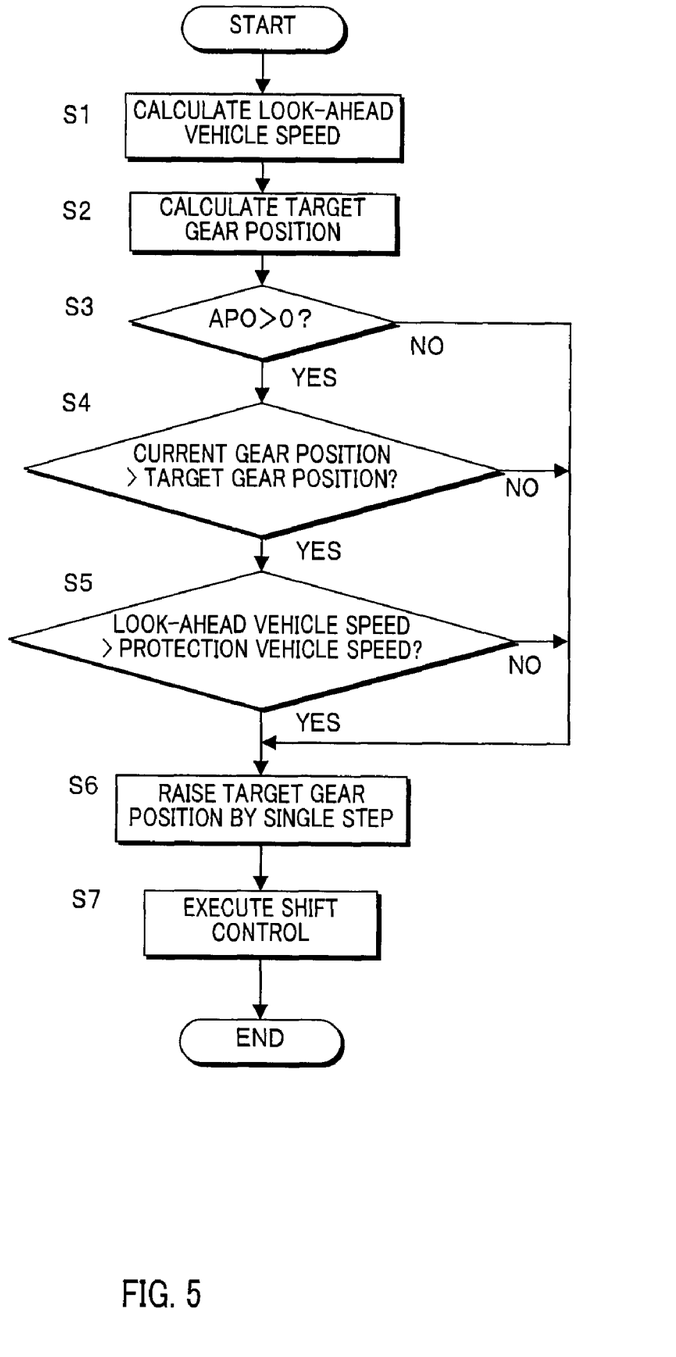
FIG. 5 is a flowchart showing control performed by a shift control device for an automatic transmission according to the embodiment.

To avoid these problems, control shown in the flowchart of FIG. 5 is performed in this embodiment separately to normal shift control. FIG. 5 is a flowchart showing control performed by a shift control device for an automatic transmission according to this embodiment.

In a step S1, the look-ahead vehicle speed is calculated. The look-ahead vehicle speed is calculated as a future vehicle speed at the start of an inertia phase on the basis of a torque obtained by subtracting air resistance, rolling resistance, and so on from the torque of the vehicle, taking into account the road surface gradient and so on, as described in JP3-103661A, for example.

In a step S2, the target gear position is calculated. The target gear position is calculated on the basis of the look-ahead vehicle speed and the throttle opening in accordance with the shift map shown in FIG. 2.

In a step S3, a determination is made as to whether or not the accelerator pedal is depressed. When the accelerator pedal is depressed, the routine advances to a step S4, and when the accelerator pedal is not depressed, the routine advances to a step S7.

In the step S4, a determination is made as to whether or not the target gear position is smaller than the current gear position. When the target gear position is smaller than the current gear position, the routine advances to a step S5, and when the target gear position is equal to or greater than the current gear position, the routine advances to the step S7.

In the step S5, a determination is made as to whether or not the look-ahead vehicle speed is higher than a protection vehicle speed. When the look-ahead vehicle speed is higher than the protection vehicle speed, the routine advances to a step S6, and when the look-ahead vehicle speed is equal to or lower than the protection vehicle speed, the routine advances to the step S7.

Figure 6:
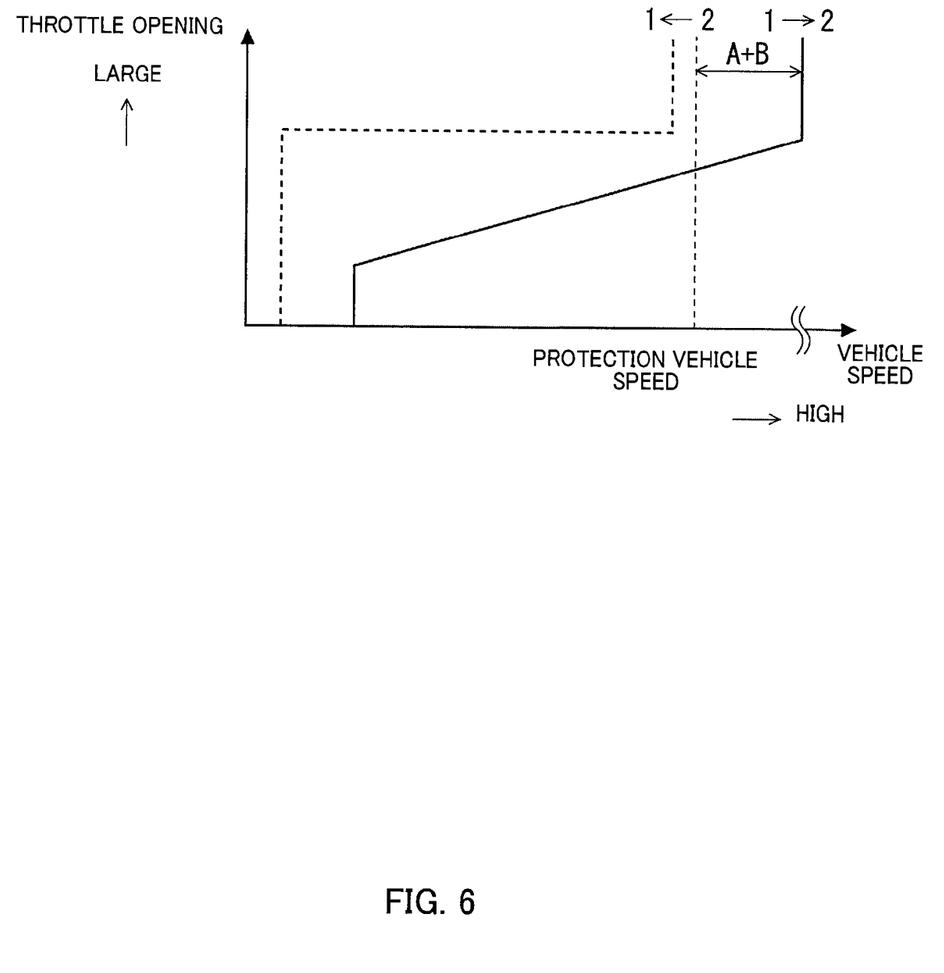
FIG. 6 is a shift map showing a 1→2 up line and a 2→1 down line.

Here, the protection vehicle speed is a vehicle speed set on the low vehicle speed side of a maximum vehicle speed of the 1→2 up line and on the high vehicle speed side of a maximum vehicle speed of the 2→1 down line, as shown in FIG. 6, taking into account the response delay that occurs in the look-ahead vehicle speed during a kickdown. For example, in FIG. 3, a response delay of "A" occurs in the look-ahead vehicle speed relative to the target look-ahead vehicle speed at the time t2, which is the point where the target look-ahead vehicle speed crosses the 1→2 up line. Further, in FIG. 4, a response delay of "B" occurs in the look-ahead vehicle speed relative to the target look-ahead vehicle speed at the time t2, which is the point where the target look-ahead vehicle speed crosses the 1→2 up line.

Hence, in a situation such as that shown in FIG. 3, in which the target look-ahead vehicle speed crosses the 1→2 up line before the 2→1 downshift is completed, a delay in the 1→2 up determination caused by the response delay in the look-ahead vehicle speed can be prevented by setting the protection vehicle speed at a vehicle speed that is lower than the 1→2 up line by an amount corresponding to "A". Further, in a situation such as that shown in FIG. 4, in which the target look-ahead vehicle speed crosses the 1→2 up line immediately after the 2→1 downshift is completed, a delay in the 1→2 up determination caused by the response delay in the look-ahead vehicle speed can be prevented by setting the protection vehicle speed at a vehicle speed that is lower than the 1→2 up line by an amount corresponding to "B".

Hence, to be able to respond to the situations shown in both FIG. 3 and FIG. 4, the protection vehicle speed is set at a vehicle speed that is lower than the 1→2 up line by an amount corresponding to "A+B". When this is reflected on the shift map, FIG. 6 is the result. It should be noted that in FIG. 6, the protection vehicle speed is shown in relation to the 1→2 up line, but is set at different values for each gear position.

In the step S6, the target gear position is raised by a single step.

In the step S7, shift control is executed in accordance with the target gear position.

Figure 7:
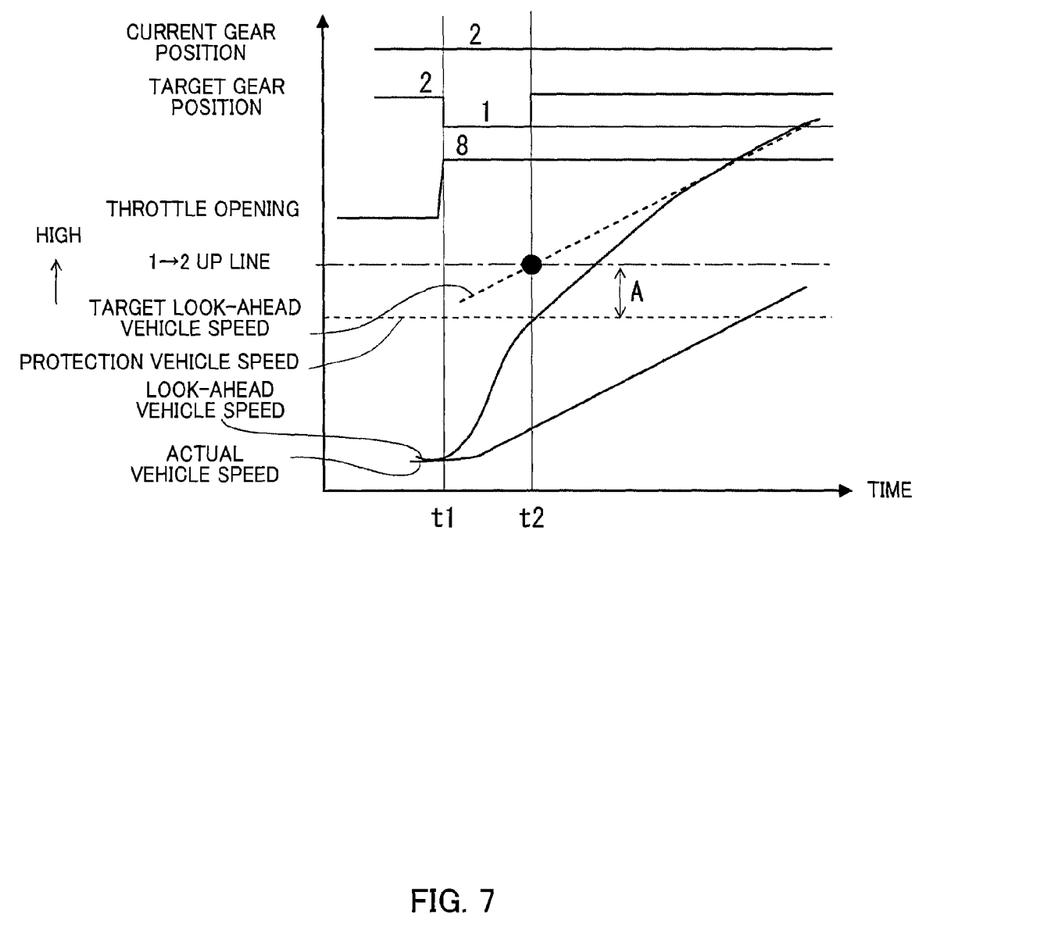
FIG. 7 is a time chart showing actions of the shift control device for an automatic transmission according to the embodiment.
Figure 8:
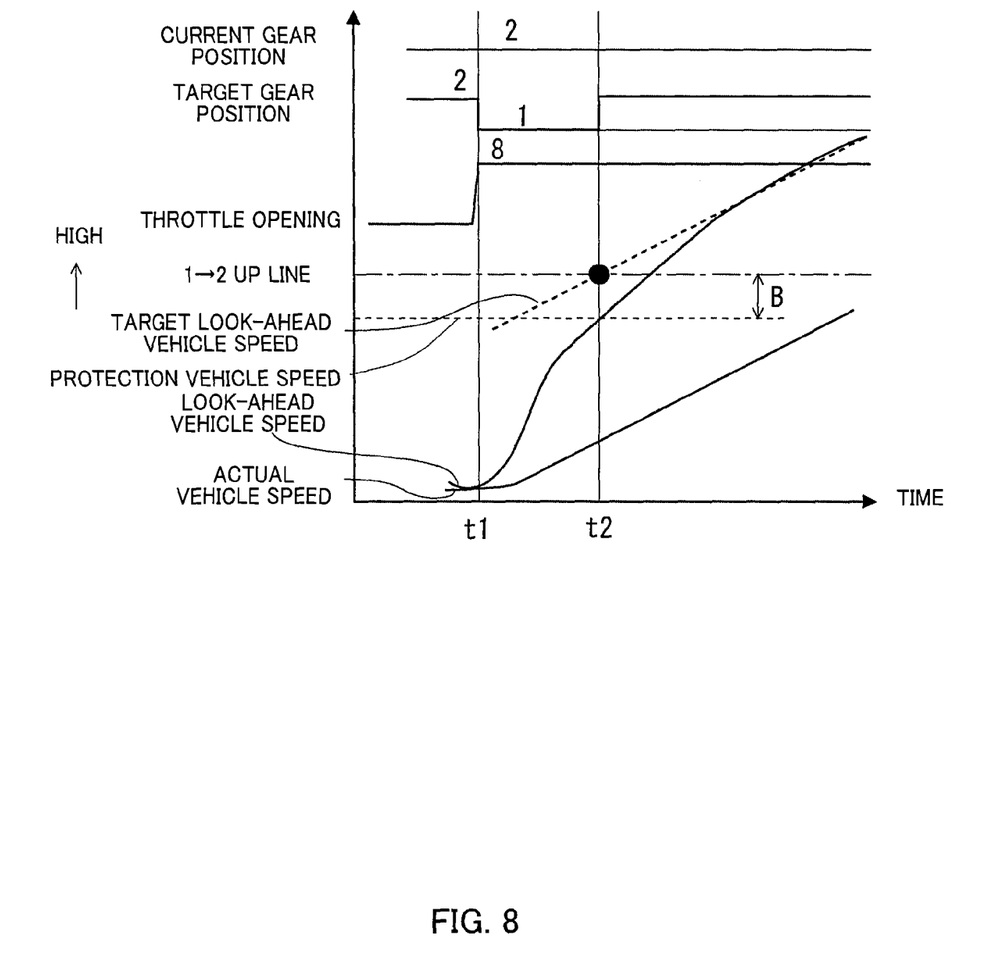
FIG. 8 is a time chart showing actions of the shift control device for an automatic transmission according to the embodiment.

Next, referring to FIGS. 7 and 8, actions of this embodiment will be described. FIG. 7 shows an example in which this invention is applied to the case shown in FIG. 3. FIG. 8 shows an example in which this invention is applied to the case shown in FIG. 4. It should be noted that in actuality, the protection line takes a value reduced by "A+B" from the 1→2 up line, as described above, but to clarify the actions of this embodiment, FIGS. 7 and 8 show cases in which the protection vehicle speed takes values reduced from the 1→2 up line by "A" and "B", respectively.

First, FIG. 7 will be described. Travel is underway in the second speed gear position, and at a time t1, the driver presses the accelerator pedal hard such that the throttle opening increases and the target gear position shifts to the first speed. At a subsequent time t2, the target look-ahead vehicle speed crosses the 1→2 up line. At this time, the look-ahead vehicle speed has not yet crossed the 1→2 up line due to the response delay. However, the look-ahead vehicle speed has exceeded the protection vehicle speed, and therefore the target gear position shifts to the second speed and the actual gear position is held at the second speed.

Hence, even in a situation where the look-ahead vehicle speed lags behind the target look-ahead vehicle speed due to a response delay, the target gear position is shifted up to the second speed as long as the look-ahead vehicle speed has exceeded the protection vehicle speed, and therefore unnecessary shift shock and shift-busy caused by a response delay in the look-ahead vehicle speed can be prevented.

Next, FIG. 8 will be described. Travel is underway in the second speed gear position, and at a time t1, the driver presses the accelerator pedal hard such that the throttle opening increases and the target gear position shifts to the first speed. At a subsequent time t2, the target look-ahead vehicle speed crosses the 1→2 up line. At this time, the look-ahead vehicle speed has not yet crossed the 1→2 up line due to the response delay. However, the look-ahead vehicle speed has exceeded the protection vehicle speed, and therefore the target gear position shifts to the second speed. As a result, the actual gear position is held at the second speed.

Hence, even in a situation where the look-ahead vehicle speed lags behind the target look-ahead vehicle speed due to a response delay, the target gear position is shifted up to the second speed as long as the look-ahead vehicle speed has exceeded the protection vehicle speed, and therefore an upshift delay caused by a response delay in the look-ahead vehicle speed, which leads to over-revving, can be prevented.

In the embodiment described above, when the need for a kickdown is determined, a shift is performed in consideration of the response delay in the look-ahead vehicle speed such that even if the operating condition determined by the look-ahead vehicle speed has not crossed the upshift line, as long as the look-ahead vehicle speed has exceeded a predetermined vehicle speed, the shift is performed as if the look-ahead vehicle speed had crossed the upshift line. As a result, a shift-busy occurring when an upshift is performed immediately after a downshift can be prevented, and over-revving of the engine rotation speed, which occurs when the need for an upshift arises during a downshift such that the start of the upshift is delayed, can be prevented.

Further, the protection vehicle speed is set on the low vehicle speed side of the maximum vehicle speed of the 1→2 up line and on the high vehicle speed side of the maximum vehicle speed of the 2→1 down line, and therefore shift-busy and over-revving can be prevented reliably. If the protection vehicle speed is set on the low vehicle speed side of the maximum vehicle speed of the 2→1 down line, when the look-ahead vehicle speed is higher than the protection vehicle speed and lower than the maximum vehicle speed of the 2→1 down line, an upshift determination during a downshift and a downshift determination during an upshift are performed repeatedly, leading to hunting in the target gear position, but in this embodiment, the protection vehicle speed is set on the high vehicle speed side of the maximum vehicle speed of the 2→1 down line, and therefore this type of hunting can be prevented.

In this embodiment, a kickdown from the second speed to the first speed was described as an example using the 1→2 up line and the 2→1 down line, but this invention is not limited thereto, and may be applied to kickdowns from the third speed to the first speed, from the fourth speed to the second speed, and so on, for example.

This application claims priority from Japan Patent Application 2008-58013, filed Mar. 7, 2008, which is incorporated herein by reference in its entirety.

What is claimed is:

1. A shift control device for an automatic transmission, comprising:
    a shift map defined by an engine load and a vehicle speed and divided into gear position regions by shift lines;
    a vehicle speed estimating unit that estimates a look-ahead vehicle speed, which is a vehicle speed at a predetermined future time, when the engine load increases such that a shift to a gear position on a low speed side of a current gear position is required;
    a target gear position setting unit that sets a target gear position according to the region of the shift map in which an operating condition, which is determined by the engine load and the look-ahead vehicle speed, is located; and
    a shift control unit that performs shift control on the basis of the target gear position, and
    wherein the target gear position setting unit sets a gear position on a high speed side of the target gear position as the target gear position when the target gear position is on a low speed side of a current gear position and the look-ahead vehicle speed is higher than a predetermined vehicle speed.

2. The shift control device for an automatic transmission as defined in claim 1, wherein the shift map comprises an upshift line for determining an upshift from the target gear position to a gear position that is on a high speed side of the target gear position by one step, and a downshift line for determining a downshift from the gear position that is on the high speed side of the target gear position by one step to the target gear position, and
    the predetermined vehicle speed is lower than a maximum vehicle speed of the upshift line and higher than a maximum vehicle speed of the downshift line.

3. A shift control method for an automatic transmission having a shift map defined by an engine load and a vehicle speed and divided into gear position regions by shift lines, the method comprising:
    estimating a look-ahead vehicle speed, which is a vehicle speed at a predetermined future time, when the engine load increases such that a shift to a gear position on a low speed side of a current gear position is required,
    setting a target gear position according to the region of the shift map in which an operating condition, which is determined by the engine load and the look-ahead vehicle speed, is located; and performing shift control on the basis of the target gear position, and wherein the setting the target gear position sets a gear position on a high speed side of the target gear position as the target gear position when the target gear position is on a low speed side of a current gear position and the look-ahead vehicle speed is higher than a predetermined vehicle speed.

4. The shift control method for an automatic transmission as defined in claim 3, wherein the shift map comprises an upshift line for determining an upshift from the target gear position to a gear position that is on a high speed side of the target gear position by one step, and a downshift line for determining a downshift from the gear position that is on the high speed side of the target gear position by one step to the target gear position, and the predetermined vehicle speed is lower than a maximum vehicle speed of the upshift line and higher than a maximum vehicle speed of the downshift line.

5. A shift control device for an automatic transmission, comprising:

a shift map defined by an engine load and a vehicle speed and divided into gear position regions by shift lines;

a vehicle speed estimating means for estimating a look-ahead vehicle speed, which is a vehicle speed at a predetermined future time, when the engine load increases such that a shift to a gear position on a low speed side of a current gear position is required, a target gear position setting means for setting a target gear position according to the region of the shift map in which an operating condition, which is determined by the engine load and the look-ahead vehicle speed, is located;

a shift control means for performing shift control on the basis of the target gear position; and wherein the target gear position setting means sets a gear position on a high speed side of the target gear position as the target gear position when the target gear position is on a low speed side of a current gear position and the look-ahead vehicle speed is higher than a predetermined vehicle speed.

6. The shift control device for an automatic transmission as defined in claim 5, wherein the shift map comprises an upshift line for determining an upshift from the target gear position to a gear position that is on a high speed side of the target gear position by one step, and a downshift line for determining a downshift from the gear position that is on the high speed side of the target gear position by one step to the target gear position, and the predetermined vehicle speed is lower than a maximum vehicle speed of the upshift line and higher than a maximum vehicle speed of the downshift line.

\* \* \* \* \*